United States Patent
Lee et al.

(10) Patent No.: US 7,916,932 B2
(45) Date of Patent: Mar. 29, 2011

(54) METHOD AND SYSTEM OF STRUCTURAL LIGHT-BASED 3D DEPTH IMAGING USING SIGNAL SEPARATION CODING AND ERROR CORRECTION THEREOF

(75) Inventors: Suk-Han Lee, Yongin-si (KR); Jong-Moo Choi, Seoul (KR); Dae-Sik Kim, Seoul (KR); Seung-Sub Oh, Suwon-si (KR)

(73) Assignee: IN-G Co., Ltd., Suwon-si (KR)

( * ) Notice: Subject to any disclaimer, the term of this patent is extended or adjusted under 35 U.S.C. 154(b) by 894 days.

(21) Appl. No.: 11/276,126

(22) Filed: Feb. 15, 2006

(65) Prior Publication Data
US 2006/0210145 A1    Sep. 21, 2006

(30) Foreign Application Priority Data

Feb. 16, 2005  (KR) ................. 10-2005-0012617
Feb. 10, 2006  (KR) ................. 10-2006-0012817

(51) Int. Cl.
*G06K 9/00* (2006.01)
*G01B 11/30* (2006.01)
*G01B 11/24* (2006.01)
*G03B 21/26* (2006.01)
*G03B 21/14* (2006.01)

(52) U.S. Cl. ........ 382/154; 382/100; 382/106; 356/603; 356/610; 353/34; 353/82

(58) Field of Classification Search .................. 382/154; 353/7, 29, 34, 82; 356/2, 3, 3.01–3.09, 51, 356/121, 138, 625, 626, 394, 399, 447, 445; 359/462, 475; 362/84
See application file for complete search history.

(56) References Cited

U.S. PATENT DOCUMENTS

| | | | |
|---|---|---|---|
| 6,504,605 B1 * | 1/2003 | Pedersen et al. | 356/141.1 |
| 7,140,544 B2 * | 11/2006 | Smith et al. | 235/462.01 |
| 2004/0151365 A1 * | 8/2004 | An Chang et al. | 382/154 |

OTHER PUBLICATIONS

Lee et al., "An Active 3D Robot Camera for Home Environment", IEEE Sensors Proceedings, 2004, pp. 477-480.*
Salvi et al., "Pattern codification strategies in structured light systems", Pattern Recognition No. 37, Elsevier Ltd.2004, pp. 827-849.*

(Continued)

*Primary Examiner* — Tom Y Lu
*Assistant Examiner* — Thomas A Conway
(74) *Attorney, Agent, or Firm* — The Nath Law Group; Jerald L. Meyer; Sungyeop Chung

(57) ABSTRACT

A 3D depth imaging method and system are disclosed. The 3D depth imaging method involves radiating light at a measurement target object using a projection means and imaging the light using an image receiving means, and includes the steps of assigning a unique transmitting side address to a signal corresponding to each pixel of the projection means to encode the signal; projecting multiple light patterns at the projection means to transmit the signal; receiving the encoded signal at the image receiving means; separating the received signal to restore the address; and determining a pixel position of the object using the transmitting side address and the restored address. With the 3D depth imaging method and system, it is possible to exactly separate signals received by the image receiving means even when the signals are overlap and the geometrical structure of the object varies, and it is also possible to obtain a depth image that is robust against ambient environmental noise.

7 Claims, 9 Drawing Sheets

OTHER PUBLICATIONS

Lee et al. (An Active 3D Robot Camera for Home Environment, IEEE Sensor Proceedings, 2004, pp. 477-480).*

* cited by examiner

METHOD AND SYSTEM OF STRUCTURAL LIGHT-BASED 3D DEPTH IMAGING USING SIGNAL SEPARATION CODING AND ERROR CORRECTION THEREOF

BACKGROUND OF THE INVENTION

1. Field of the invention

The present invention relates to a 3D depth imaging method and system, and more particularly, to a 3D depth imaging method and system capable of more exactly imaging a 3D depth by exactly restoring a modified signal using a new scheme called signal separation coding.

2. Description of the Prior Art

In general, a method of three-dimensional (3D) depth imaging using a structural light is recently receiving attention because it is suitable for sensing a 3D environment in service robotics. The basic principle of depth imaging using a structural light, which is an active stereo scheme, is to radiate light at an object using a projection means such as a projector, image the object irradiated with light using an image receiving means such as a camera, and observe the extent of distortion of the light due to the object in order to calculate the depth of the object and obtain a depth image.

FIG. 1 is a schematic diagram illustrating a principle of a structural light-based 3D depth imaging system. As shown in FIG. 1, a 3D position of one point x on an object 100 is determined as an intersection point of a straight line connected between an origin $O_p$ of a projection means and a point p on the retinal plane 200 of the projection means, and a straight line connected between an origin $O_c$ of an image receiving means and a point q on a retinal plane 300 of the image receiving means. Accordingly, a depth image can be obtained by calculating the coordinates of a point x as a pair of address values on each retinal plane at the points p and q after the projector and the camera are calibrated. That is, the core of the depth imaging method employing such a stereo scheme is to determine a pixel correspondence point between the received image and the projected image. With the determined correspondence point, the depth can be easily calculated using simple geometry.

For the accuracy of depth imaging, a light pattern projected by the projection means is coded spatially and/or temporally according to a time sequence on a pixel array so that a spatial and/or temporal address of the signal detected by the image receiving means uniquely determines the pixel correspondence point of the corresponding projection means.

Examples of such a conventional coding method include direct coding, spatial coding, temporal coding, and hybrid coding methods.

In the direct coding method, a grey and/or color level is directly used in coding, and a disparity image is calculated through one pattern frame. This method has the advantage of high speed. However, the accuracy and robustness of the method are poor due to ambient illumination variation and noise.

In the spatial coding method, a specially designed, coded pattern, which is arranged on a pixel array, is used. A De Brujin sequence, a quasi random code or the like is also used. The thus coded pattern is used to provide pixel address information from an adjacent pixel. Spatial coding obtains a disparity image from one or two frame patterns. This method has high speed and improved robustness in error correction because of its address information. However, spatial coding is affected by signal modification or complexity of an object because it uses spatially arranged address information for pixel correspondence.

Temporal coding uses coding patterns arranged along the time axis. A binary code, an N-ary code, and a line shifting-based gray code have been suggested. Generally, temporal coding has higher accuracy than spatial coding. This is because temporal coding has no order restriction and is possible using a black and white color signal. However, temporal coding is not suitable for a rapidly changing scene because of its use of a frame sequence.

Hybrid coding uses a mixture of temporal coding and spatial coding. This coding method can obtain a robust depth image. However, hybrid coding cannot be used in a very complex environment because it has the shortcomings of spatial coding. Spatial coding and hybrid coding are suitable for an object having a continuous surface. They may undergo transposition of the address sequence in a discontinuous surface.

Such conventional coding methods are focused on designing a spatial and/or time code in calculating a single pixel based on address information. However, the conventional coding methods have a fundamental limitation in calculating a higher-accuracy pixel correspondence point needed for exact depth imaging. In particular, they overlook a complex boundary surface such as occluding and shading the neighborhood of a boundary, or transposition that address information undergoes in pixel correspondence. Accordingly, the accuracy of depth imaging for a complex object is very low. It results from the fact that the conventional method is focused on coding the received signal based on address information and does not consider a signal modification extent making the address information inexact at the image receiving means side. Further, even though a long time code sequence providing each pixel at a projection means side having a unique address is used, it is not effective in processing signal modification.

Further, it should be considered that the signal received by the image receiving means is affected by system/environmental noise such as light scattering, reflectance change, and ambient illumination variation, and undergoes multiple code mixing in which the signal is mixed with pixels adjacent to the projection means and even remote pixels. However, conventional methods overlook such matters.

Accordingly, the present inventors suggest a new coding method called a "signal separation scheme" to solve the aforementioned problems.

SUMMARY OF THE INVENTION

The present invention has been made to solve the aforementioned problems of the conventional art. The present invention provides a structural light-based 3D depth imaging method and system using a signal separating and coding method capable of exactly separating an original signal even when a plurality of signals received at an image receiving means overlap.

The present invention also provides a signal separating and coding method and system for correspondence point determination capable of exactly separating a signal even when the signal is distorted by a complex boundary surface of an object in 3D depth imaging.

The present invention also provides a signal separating and coding method and system for determining a correspondence point in structural light-based 3D depth imaging having robustness against ambient system/environmental noise.

The present invention also provides a technique enabling easy interpretation of change in the physical relationship between an artificial light source, an object, and a camera.

According to an aspect of the present invention, there is provided a method of 3D depth imaging by radiating light at a measurement target object using a projection means and imaging the light using an image receiving means, the method comprising the steps of: assigning a unique transmitting side address to a signal corresponding to each pixel of the projection means to encode the signal; projecting multiple light patterns at the projection means to transmit the signal; receiving the encoded signal at the image receiving means; separating the received signal to restore the address; and determining a pixel position of the object using the transmitting side address and the restored address.

The step of separating the received signal may comprise an error correction step including the steps of calculating possible address candidate values corresponding to the transmitting side address; and determining an address according to a rule for obtaining an exact address from the candidate values, and the rule is selected from: a rule that the restored address values gradually increase or decrease with no continuity when the signal is obtained from a slanted surface of the object; a rule that the restored address values vanish or are transposed in part with no continuity when the signal is obtained from a cut surface of the object; and a rule that the restored address values vanish with no continuity when the signal vanishes by a shadow of the object.

The step of separating the received signal may comprise an error correction step including the steps of: calculating possible candidate values of an address corresponding to the transmitting side address; and defining an evaluation function by considering a group of address candidates at one's position and address candidates at neighboring positions among the candidates, and determining the address using a searching method for maximizing or minimizing the evaluation function.

The step of separating the received signal may comprise an error correction step including the steps of: calculating possible candidate values of an address corresponding to the transmitting side address; and calculating an address value at a position having high reliability, fixing the address value at the position, and then determining the candidates from address values in other areas in order to select the address from a plurality of candidate groups consisting of the candidates.

The light pattern may be a binary light pattern, a color light pattern, a light pattern having a brightness value of a gray scale, a light pattern of an ultraviolet or infrared area in a non-visible area, or a mixture of these.

The step of encoding the signal may comprise using orthogonal signals among adjacent signals at the projection means.

All the orthogonal signals may be classified into one or more hierarchical signals, and use codes that are orthogonal to one another in each layer.

All the orthogonal signals may be classified into one or more hierarchical signals, and use a mixture of codes that are orthogonal to one another in each layer and codes that are not orthogonal to one another.

The step of encoding the signal may comprise using pseudo orthogonal signals having orthogonality among adjacent signals of the projection means.

The step of encoding the signal may comprise using statistically independent signals among adjacent signals of the projection means.

According to another aspect of the present invention, there is provided a method of 3D depth imaging in a system including a projector and a camera, the method comprising the steps of: emitting a pattern from the projector to an object; receiving the pattern using the camera; calculating a pixel correspondence relationship between the projector and the camera through signal separation on each epipolar line; and creating a new image at a time point of the projector after the calculating step is performed.

According to still another aspect of the present invention, there is provided a method for restoring a stereo image in a system including a projector and a camera, the method comprising the steps of: emitting a pattern from the projector to an object; receiving the pattern using the camera; calculating a pixel correspondence relationship between the projector and the camera through signal separation on each epipolar line; and creating a new image at a time point of the projector after the calculating step is performed, in which the stereo image is restored using an image obtained by the camera and the new image created by the projector.

According to yet another aspect of the present invention, there is provided a method for restoring a measuring depth in a system including a projector and a camera, wherein the method restores the measuring depth using both a structural light-based 3D depth imaging method comprising the steps: assigning a unique transmitting side address to a signal corresponding to each pixel of the camera to encode the signal; projecting multiple patterns from the projector to transmit the signal; receiving the encoded signal at the camera; separating the received signal to restore the address; and determining a pixel position of an object using the transmitting side address and the restored address, and a stereo image restoring method comprising the steps of: emitting a pattern from the projector to the object; receiving the pattern using the camera; calculating a pixel correspondence relationship between the projector and the camera through signal separation on each epipolar line; and creating a new image at a time point of the projector after the calculating step is performed.

According to yet another aspect of the present invention, there is provided a structural light-based 3D depth imaging system comprising: projection means for radiating light at a measurement target object; image receiving means for imaging the light radiated from the projection means; and processing means for imaging a 3D depth of the measurement target object, the processing means sequentially performing: encoding a signal corresponding to each pixel of the projection means by assigning a unique transmitting side address to the signal; projecting multiple light patterns at the projection means to transmit the signal; receiving the encoded signal at the image receiving means; separating the received signal to restore an address; and determining a pixel position of the object using the transmitting side address and the restored address.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

Figure 1:
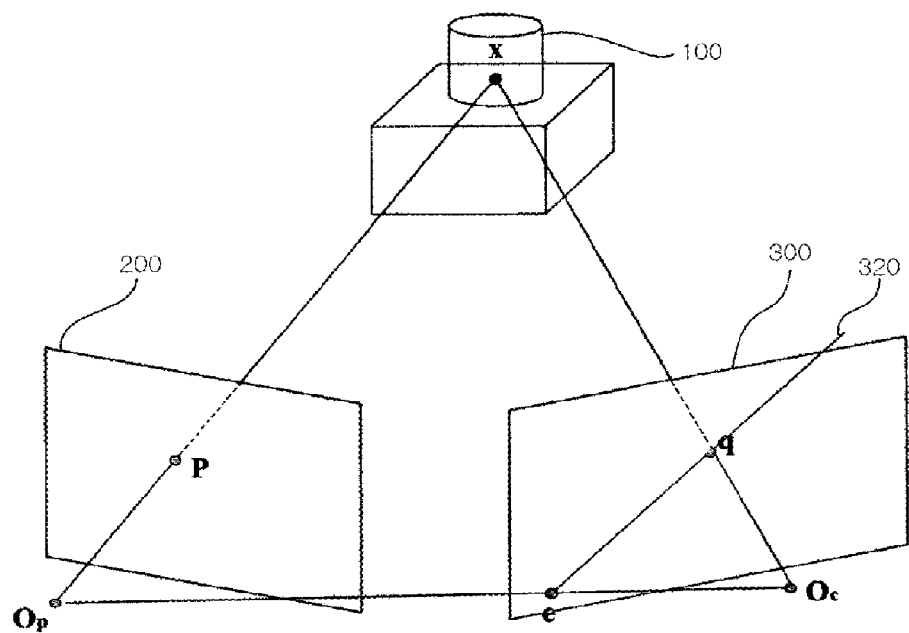
FIG. 1 is a conceptual diagram illustrating a 3D imaging method using a structural light.

Hereinafter, preferred embodiments of the present invention will be described with reference to the accompanying drawings. In the following description and drawings, the same reference numerals are used to designate the same or similar components, and such components will only be described once.

First, the concept of the present invention will be described.

In a 3D depth imaging method according to the present invention, it is important to determine an exact correspondence point between a pixel position at a projection means such as a projector and a pixel position at an image receiving means such as a camera in order to obtain an exact depth image. From the determined correspondence point, 3D data of an object is easily calculated using simple geometry. Because the correspondence point on a stereo image exists on an epipolar line 320 shown in FIG. 1, it suffices to search only on the epipolar line. In particular, in a parallel stereo system in which the projection means is parallel with the image receiving means, the epipolar line matches a column or a row of a retinal plane. Thus, calculation becomes simple. If the projection means is not parallel with the image receiving means, the parallel stereo system is configured through a calibration and rectification process. The calibration and rectification process can be easily performed by those skilled in the art.

In a typical structural light scheme, a 3D image is restored by emitting a series of patterns to the object at a projection means and analyzing an obtained image at the image receiving means. In this case, it is necessary to calculate an exact pixel correspondence relationship between the projection means and the image receiving means. In an actual case, however, signals transmitted by the projection means are mixed due to various sources of error and received by the image receiving means.

Figure 2:
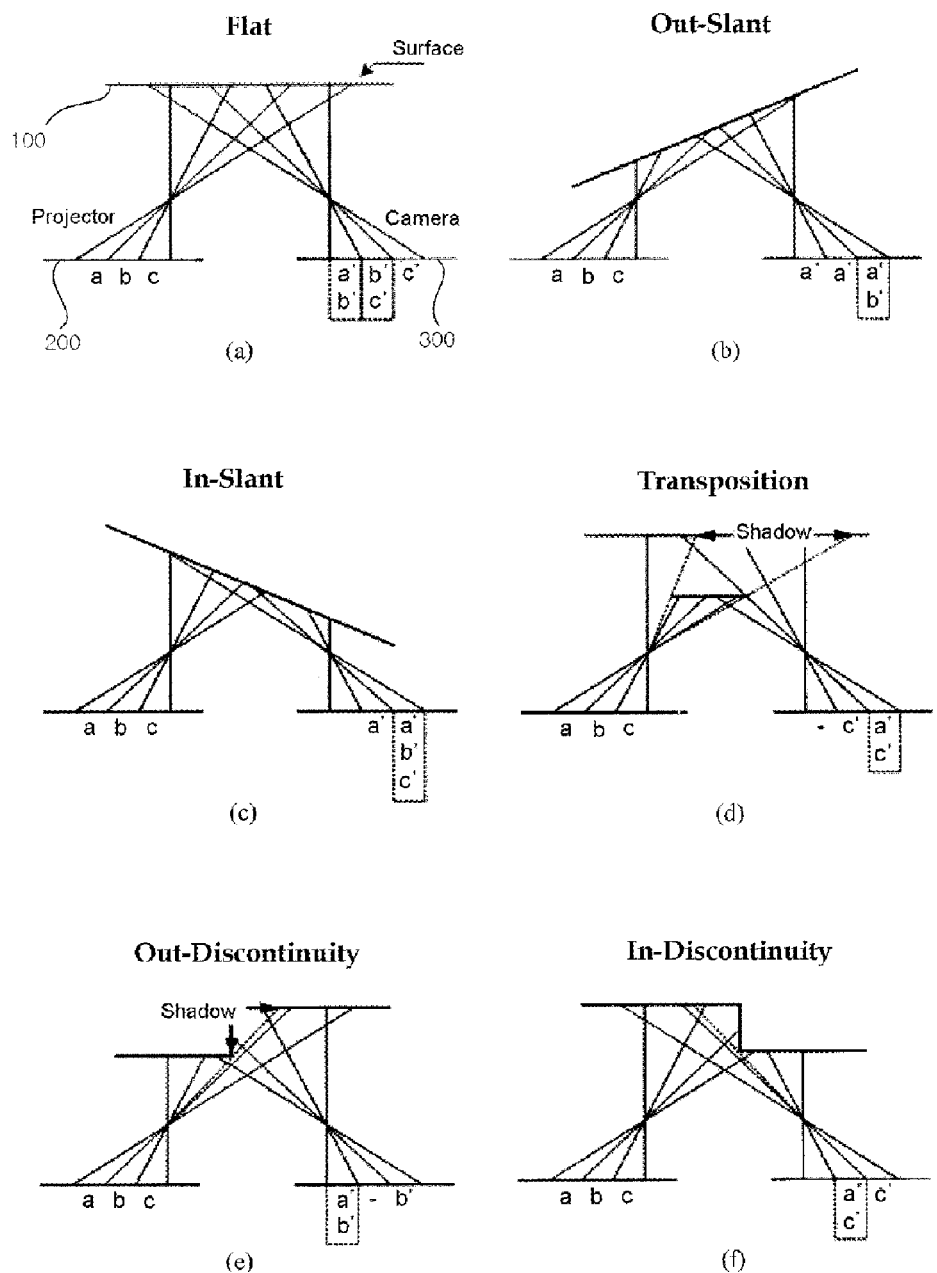
FIG. 2 is a conceptual diagram illustrating signal mixture according to a geometrical relationship of an object.

The geometrical structure of the surface of the object 100 can account for such signal mixing. FIG. 2 shows a signal mixture model according to the geometrical structure of the object surface. Even when the surface of the object 100 is flat and parallel with retinal planes 200 and 300 of transmitting and receiving sides as in FIG. 2(*a*), signal mixing occurs due to a difference in size and position between light projected by the projection means and a receiving area of the image receiving means. If the surface of the object 100 is slanted toward the projection means (Out-Slant) as in FIG. 2(*b*), light from adjacent pixels on the retinal plane 200 of the projection means may overlap and be incident on a corresponding pixel on the retinal plane 300 of the image receiving means. On the other hand, if the surface of the object 100 is significantly slanted toward the retinal plane 200 of the projection means (In-Slant) as in FIG. 2(*c*), some light from adjacent pixels on the retinal plane 200 of the projection means may be incident on a corresponding pixel on the retinal plane 300 of the image receiving means.

Further, when there is a separate object around the object 100 (Transposition) as in FIG. 2(*d*), code transposition occurs on an adjacent surface and two remote separated surfaces of the separate object. In the case of FIG. 2(*e*) (Out-Discontinuity), a code is deleted by a receiving area on the retinal plane 300 of the image receiving means and a shadow at the projection means. In the case of FIG. 2(*f*) (In-Discontinuity), when there is a rapid discontinuous point of the depth at a boundary between cut surfaces of objects, light from adjacent pixels and remote pixels of the image receiving means may overlap and be incident on a corresponding pixel.

In addition to such signal mixing, the signal received by the image receiving means may be distorted due to system/environment noise such as surface reflectance variation, light scattering on the object surface, and ambient illumination variation. Surface reflectance variation changes signal intensity, and light scattering on the object surface causes blurring or signal mixing. In addition, ambient illumination variation may cause signal intensity variation. Such factors such as the signal mixing make a pixel point correspondence relationship between the projection means and the image receiving means inexact. This inexactness of the correspondence point relationship causes a fundamental error in obtaining a 3D depth image in a structural light scheme.

The signal separating and coding method according to the present invention is designed to exactly restore a pixel correspondence point address of a projection means side through a mixed-signal separation process. A fundamental difference with the conventional coding method is that the signal separating and coding method introduces a process of separating the pattern signal received by the image receiving means. In order to easily separate the signal, multiple light patterns are radiated in the encoding process from the projection means.

Signal mixing and the separation process in the present invention can be modeled as follows:

(1) Signal mixing: when a signal is mixed with a neighboring signal, pixel brightness at the projection means side is assumed to be the weighted sum of the brightness of a pixel and the brightness of a neighboring pixel. That is, the relationship between a projection means side signal and a image receiving means side signal can be represented as a linear mixed signal model, Y=XW. X $R^{(f \times m)}$ and Y $R^{(f \times m)}$ are a matrix consisting of a transmitting code $x_i=x_1, \ldots, x_f^T$ sent by the projection means and a matrix consisting of a mixed image signal $y_1=y_1, \ldots, y_f^T$ at the image receiving means side, respectively, and W $R^{f \times m}$ is a mixing matrix consisting of mixing coefficients, where f denotes the length of the signal and m denotes the number of pixels. For example, when the temporal coding method is used, f indicates the number of frames.

(2) Signal separation: if X is a regular orthogonal matrix, the mixing matrix is easily calculated as W=$X^T$Y. Accordingly, if one value is greater than a neighboring signal value even when the signals are mixed upon transmitting patterns using the orthogonal signal, the index value of the greatest code projected to orthogonal codes can be determined as code $y_j$=argmax(j)$W_{ij}$.

This model is a generalized model that does not consider the geometrical relationship between the projection means and the image receiving means, in which a search for pixel correspondence between the projection means and the image receiving means is performed on only the epipolar line rather than all images, similarly to stereo vision. In particular, the search may be performed based on the column or row of the image since the epipolar line matches a column or row of the projection means and the image receiving means in the parallel stereo condition as described above. For example, if the means are arranged in parallel with each other, the epipolar line matches these columns.

In the present invention, 3D depth imaging is performed by using encoding, decoding and error-correcting methods using such a signal separation concept.

First Embodiment

Figure 3:
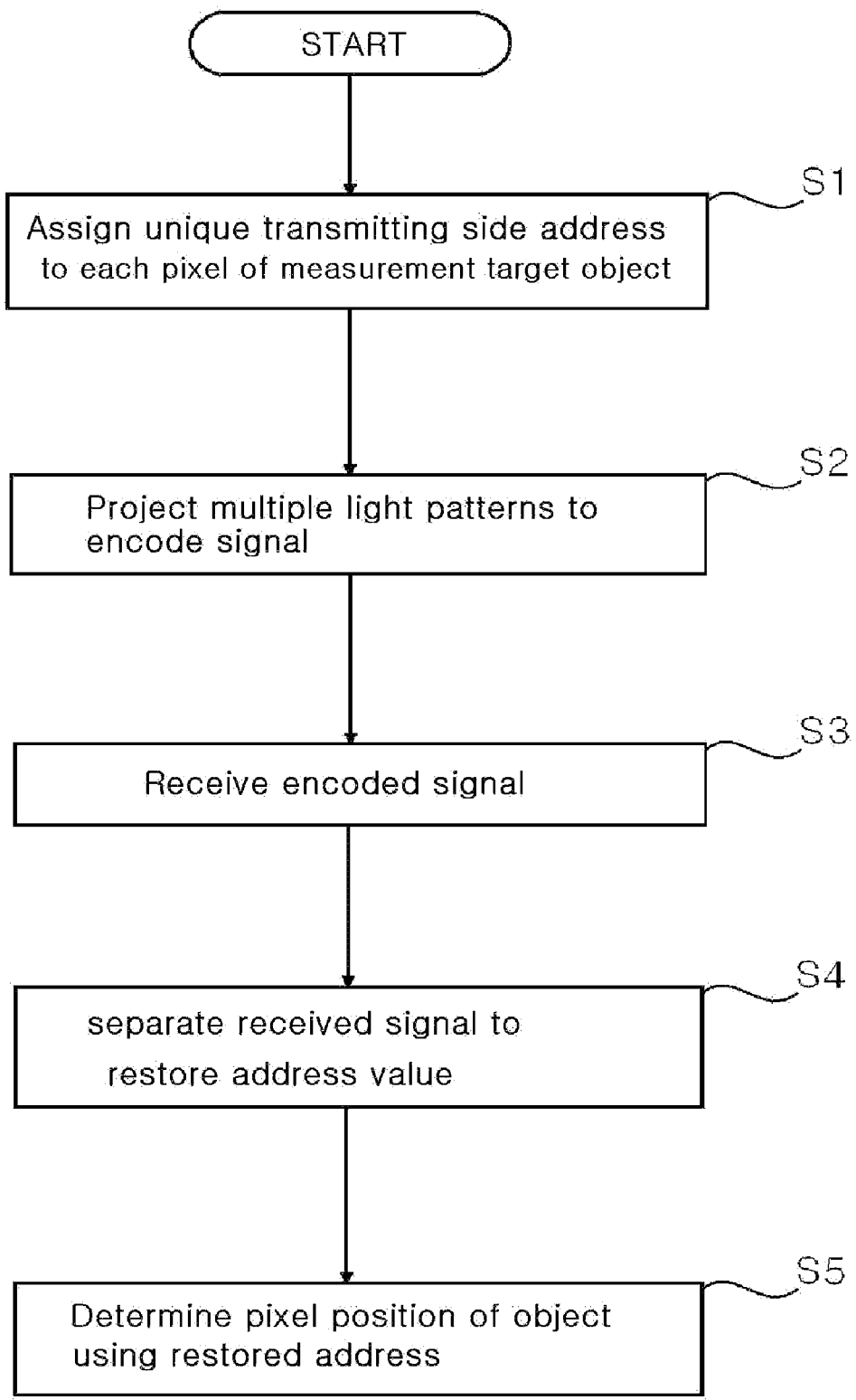
FIG. 3 is a flowchart illustrating a 3D imaging method using signal separation according to an embodiment of the present invention.

FIG. 3 is a flowchart illustrating a 3D imaging method using signal separation according to an embodiment of the present invention.

As shown in FIG. 3, a unique transmitting side address is assigned to a signal corresponding to each pixel of a measurement target object, in step S1. In step S2, multiple light patterns are projected by the projection means to encode a signal including the transmitting side address. Each pattern is received in step S3. In step S4, an original signal is separated through a signal separation process. A correspondence point is calculated from the restored signal in step S5.

The steps are performed by a processing means that processes collected data. That is, the processing means used in the present invention is a processor that can perform steps S1 to S5. The processing means is typically implemented by a computer system.

An example of the signal encoding and decoding processes and the error detection and correction used in the present invention will now be described.

Signal Encoding

In the present invention, a proper signal coding method is needed to calculate a pixel correspondence point using signal separation. A concrete example of the coding method allowing signal separation includes projecting a plurality of patterns onto a time axis. In particular, an encoding method using adjacent orthogonal signals on a time axis may be used. A method of hierarchically arranging and using orthogonal signals may be introduced to reduce the number of frames.

The structural light system used in the present invention can be regarded as one communication system having an information source, an information source encoding unit, a channel, a noise source, a decoding unit, and a receiving unit. When the projection means transmits encoded addresses, distortion of the signal due to a geometrical structure of an object and system/environment may be regarded as addition of the noise to the channel. When the image receiving means receives signals containing noise, an original signal can be restored from the received signals. If an order of signals sent by the projection means is obtained, a disparity with the received signal can be calculated and, accordingly, a 3D image can be restored.

In the structural light system using orthogonal signals according to an exemplary embodiment of the present invention, a communication process includes an encoding process and a decoding process. In the encoding process, a unique address is assigned to a pixel position of each image at a projection means side. In this case, the structural light system suffices to assign the unique address only to columns or rows of the image instead of assigning a unique address to all images, because it can consider an epipolar line geometrical condition, similarly to stereo vision. When it is assumed that N pixels are placed on one epipolar line, the transmitting signal from the projection means includes N addresses.

$$S=\{s_1, s_2, \ldots, s_N\} \, N.$$

A binary code may be used to provide channel coding that is robust against environmental noise. That is, binary code, $B=\{b_1, b_2, \ldots, b_N\}$ corresponding to a source can be defined.

If a complete orthogonal binary code (i.e., $<b_i, b_j>=0, i \neq j$) is used, the number of images that should be obtained at the image receiving means needs to be equal to the code length. Thus, while much calculation time is consumed, an exact depth image can be obtained. In this manner, in the present invention, hierarchical orthogonal coding (HOC) in which orthogonal signals are hierarchically arranged may be used to solve the problem of an increasing number of frames. This HOC scheme is focused on shortening the length of the signal while keeping the nature of the orthogonal codes as much as possible.

Figure 4:
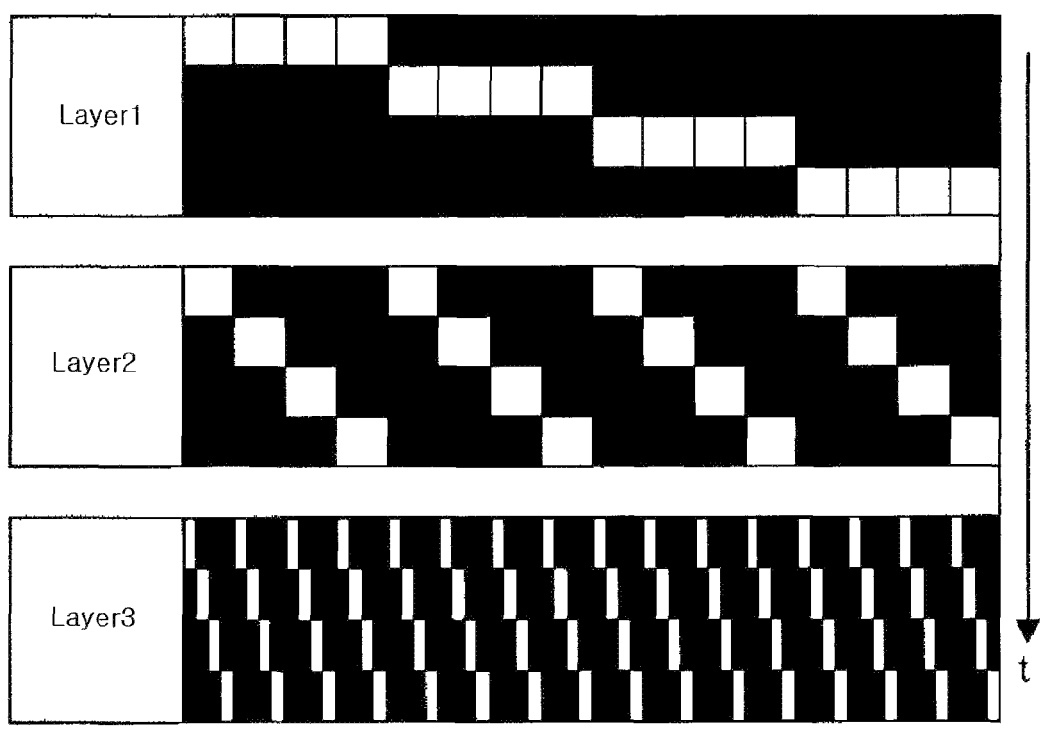
FIG. 4 is a conceptual diagram illustrating a hierarchical orthogonal code, one example of a code that can be used for signal separation coding according to an embodiment of the present invention.

FIG. 4 shows an example of this hierarchical orthogonal code. As shown in FIG. 4, all signals are classified into one or more layers, and each layer consists of a group of orthogonal signals. In the encoding process, a signal having N lengths is divided into L layers and each layer uses H orthogonal signals. While the entire signals are not orthogonal to one another, they are orthogonal to one another within a uniquely designated range on an upper layer in a certain area of each layer. For example, if HOC uses four layers (L=4) and four orthogonal signals ($H_1=H_2=H_3=H_4=4$) are used in each layer, the number of all the signals becomes 256 ($H_1 \times H_2 \times H_3 \times H_4 = 4^4 = 256$) and the code length becomes 16 ($H_1+H_2+H_3+H_4=16$). That is, the image receiving means needs an image of 16 frames to restore the address.

Signal Separation

In the signal separating and coding method according to an embodiment of the present invention, the signal separation process separates an original signal from a mixed signal to obtain address values received from the projection means. Let the i-th position of a temporal and spatial image of f frames obtained in the image receiving means be represented as I(i, t), and a brightness value of a pixel at that position as a vector $y_i = y_1, \ldots, yf_T$. If HOC has L layers, a vector y may be represented by one extension vector $y_i = b_1, b_2, \ldots, b_L^T$ consisting of image vectors that represent a brightness value in each layer. A suffix of the image vector $b_j$ indicates the j-th layer. Because each layer uses H orthogonal signals, the vector b is represented by a linear combination of orthogonal signals, i.e., b=Xc, where, c and X denote a coefficient vector and an orthogonal code matrix, respectively. That is, the vector b indicating the brightness value at a specific position includes other signals affected by the geometrical nature of an object and an environment and by reflection from the object surface.

On the L-th layer, a coefficient vector c(i) at the i-th position can be calculated by the dot product of a transposed orthogonal matrix and the signal vector b(i) measured at the position, i.e., $C(i)=X^T b(i)$. The extension coefficient vector $c=c_1, c_2, \ldots, c_L^T$ corresponding to an extension vector $y_i = b_1, b_2, \ldots, b_L^T$ for all the layers can be obtained through this process. According to the HOC hierarchical structure, a total number of possible addresses at the i-th position becomes $H^L$. That is, when four layers and four orthogonal signals are used, a total of 256 possible candidates exist.

Figure 5:
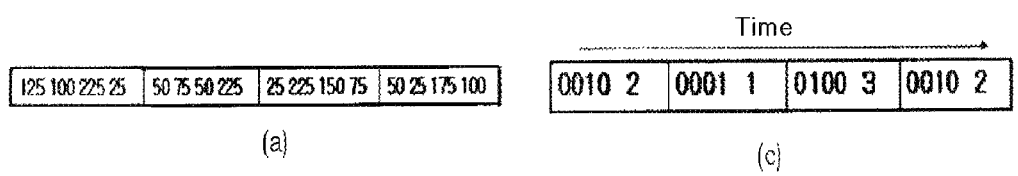
FIG. 5 is a conceptual diagram illustrating a process of separating a hierarchical orthogonal code in signal separation coding according to an embodiment of the present invention.
Figure 5:
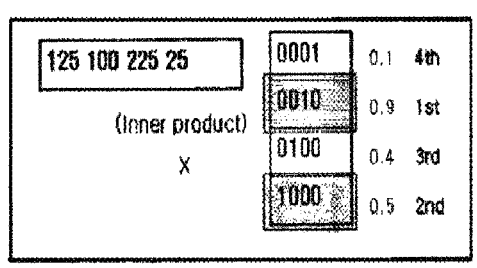
Figure 5:
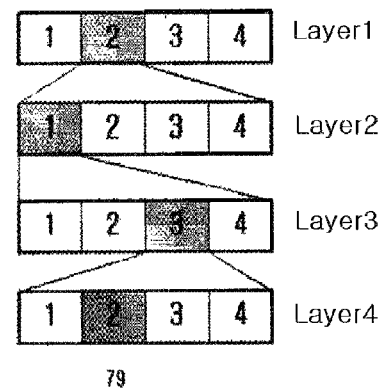

A conceptual diagram of such a signal separation process is shown in FIG. 5. In FIG. 5(a), 16 frames are obtained at the i-th position on the epipolar line of the camera image. The original signal is separated through the dot product for the orthogonal matrix in FIG. 5(b), a possible code is selected in FIG. 5(c), and an exact address is determined in FIG. 5(d). Here, the process of determining the exact address is simplified by using typical signal intensity as a reference. Normally, the address is determined by a signal having maximum signal intensity.

After the address is determined, a depth image may be measured by simple geometry. A method for measuring a depth using the original pixel position and the received pixel position is well known in the art to which the present invention pertains and thus a detailed description of the method will be omitted.

Error Detection and Correction

Because the received signal is a mixture of a plurality of signals, it cannot be said that the received signal always provides an exact address just because it has the maximum intensity. Accordingly, it is possible to correct more errors using intensity at a neighboring position and statistical distribution of restored candidate address values, as well as the signal intensity, in determining an exact address from possible candidates. Such an error correction process can make the coding robust against a variety of noise.

The error correction method in the present invention includes error correction using a rule, error correction using an evaluation function, and a mixture of conventional coding and the orthogonal coding.

(1) Error Correction Using HOC-code Transposition Rule

This type of error correction uses the fact that restored address values exhibit a systematic pattern. Since a series of address values restored on the epipolar line reflect the geometrical structure of an object and an environment, the address values exhibit the systematic pattern. Candidate addresses obtained through the signal separation process are changed in the same pattern. It is possible to use an error correction method that provides exact disparity based on this principle. With address candidates of all positions, it is possible to detect and correct inexact addresses.

Groups of the candidate codes or the DMA pixel addresses $\{D_{i-k}, p_{i-k}\}, \ldots, \{D_{i-1}, p_{i-1}\}, \{D_i, p_i\}, \{D_{i-1}, p_{i+1}\}, \ldots, \{D_{i+k}, p_{i+k}\}$ are obtained along the epipolar line through the signal separation process for camera pixels $C_{i-k}, \ldots, C_{i-1}, C_{i+1}, \ldots, C_{i+k}$. A 16-bit HOC code is assigned a priority index p based on a relative signal intensity level calculated in the signal separation process.

Accordingly, the code transposition rule for error detection is as follows:

Plane rule: groups $\{D_{i-k}, p_{i-k}\}, \ldots, \{D_{i-1}, p_{i-1}\}, \{D_i, p_i\}, \{D_{i+1}, p_{i+1}\}, \ldots, \{D_{i-k}, p_{i+k}\}$ have the same number of elements. Continuous change of pixel addresses is shown while in movement from $C_{i-k}$ to $C_{i+k}$.

Slanted surface rule: the number of the groups $\{D_{i-k}, p_{i-k}\}, \ldots, \{D_{i-1}, p_{i-1}\}, \{D_i, p_i\}, \{D_{i+1}, p_{i+1}\}, \ldots, \{D_{i+k}, p_{i+k}\}$ gradually increases or decreases. The gradual increase or decrease is treated as the same address is repeated by expansion of a light projected onto the slanted surface, or continuous address overlap occurs by the light projected onto the slanted surface. Generally, the continuous change of the pixel address remains unchanged even when an element increases or decreases.

Occluding rule: groups $\{D_{i-k}, p_{i-k}\}, \ldots, \{D_{i-1}, p_{i-1}\}, \{D_i, p_i\}, \{D_{i+1}, p_{i+1}\}, \ldots, \{D_{i+k}, p_{i+k}\}$ indicate a rapid address change of the pixel whose address is deleted.

Shadow/shading rule: when groups $\{D_{i-k}, p_{i-k}\}, \ldots, \{D_{i-1}, p_{i-1}\}, \{D_i, p_i\}, \{D_{i+1}, p_{i+1}\}, \ldots, \{D_{i|k}, p_{i\,k}\}$ enter or exit the shadow, the number of elements gradually decreases to zero or gradually increases from zero.

(2) Error Correction Using Evaluation Function

The image measuring process according to the present invention is a complex process related to selecting a possible code group and an address having the highest reliability from the group. A reliability index function may be used in this process.

When HOC uses L layers and H orthogonal codes, a total number of address value candidates at a specific position becomes $L^H$. A more simplified method may be applied even when all cases are allowed to be considered. It can be assumed that one signal is created by mixing at most two dominant signals in order to reduce calculation complexity. The use of this assumption allows consideration of only $2^L$ candidates, not $L^H$ candidates.

In other words, first, two representative signals are selected based on signal intensity in each layer of HOC. Second, a reliability index can be defined using, as factors, the size of a signal at a relevant position, uncertainty of a difference with neighboring signals, and continuity reflecting a structural relationship of the object and the environment, in order to determine an address having the highest reliability. That is, a code $y_i$ in the image at the $y_i$ position may be determined by uncertainty reflecting a difference between the signal size of $y_i$ and the size of a neighboring signal, continuity of a calculated depth at an adjacent position, and the like. That is, a cost function h can be defined in Equation 1:

$$h(c_i) = \prod_{j=1}^{l} C_i(j) w_i(j) + \lambda 1 \sum \left( w_i \log\left(\frac{1}{w_i}\right) \right) + \lambda 2 g(c_i, c_k) \quad \text{Equation 1}$$

where, the weight vector $y_i$, $w_i = w_1, \ldots, w_f^T$, and the binary code $c_i$=code $y_i$.

In Equation 1, $Ci(j)$ and $w_i=(w_1, \ldots, w_f)^T$ denote a decoded signal and a weight vector, respectively. The terms $\Pi C_i(j) w_i(j)$ and $\Sigma(w_i \log(1/w_i))$ correspond to the signal size of the orthogonal code Ci and a measured entropy value for uncertainty measuring, respectively. The function $g(C_i, C_k)$ indicates a measured value corresponding to the geometrical continuity at a position of the depth information. The function may be variously defined. For example, a simple slope may be used to define the function. $\lambda 1$ and $\lambda 2$ are coefficients for adjusting the size of each factor.

(3) Error Correction Using Mixture Method

Temporal coding such as a conventional gray code may be mixed with the orthogonal coding to reduce the number of images and amount of calculation. The orthogonal code is then used to correct a temporal coding error. That is, the orthogonal code can determine pixel position more accurately than the time code. Because the time code has a higher uncertainty at its lower bit, an error in the local window area can be corrected using the orthogonal code.

An orthogonal code having a length of K (e.g., three frames) is attached before and after a typical temporal code. Since the orthogonal code uses only a signal having a short length, its position in the entire image cannot be completely determined. However, the position can be determined within an adjacent local area. That is, the position can be selected from K−1, K and K+1. This nature can be used for calibration to a local position specified by the orthogonal code when the position restored using the orthogonal code does not match the position obtained using the time code.

While the present invention has been described in connection with coding using the orthogonal code and the hierarchical orthogonal code, it is not limited to such a code. A method for restoring the original signal using a variety of codes such as a pseudo orthogonal code, a mixture of an orthogonal code and a non-orthogonal code, and a statistically independent signal is possible.

The signal separating and coding method according to the present invention may be used in cooperation with a conventional coding method. That is, the signal separating and coding method of the present invention may be used to correct the restored address value without using signal separation after signal separating and coding is performed on some of multiple light patterns.

Second Embodiment

The signal separation coding scheme according to the first embodiment is to estimate signal mixture between the projector pixel and the camera pixel in order to determine the pixel correspondence. In the mixed-signal separation process, a result of projecting the received signal to a hierarchical orthogonal signal group is represented in a projector-camera signal space. 3D depth image calculation is a process of determining a projector side signal corresponding to each pixel of the camera in the projector-camera signal space.

The second embodiment suggests (1) a scheme for creating an image at a time point of a projector without explicit 3D restoration, (2) a new method for restoring 3D by simultaneously calculating a pixel-by-pixel correspondence between the created stereo image and the structural light, using Hermann von Helmholtz's complementarity principle that light from one light source reflected on an object surface can be equally interpreted as light from a receiving side reflected on the object surface and arriving at the light source, and using the signal separation coding scheme.

Conventional dual photography has used a time-consuming analysis method to analyze a geometrical relationship among the projector, the object and the camera. The present invention uses a two-step analyzing method different from the conventional method. First, an encoded signal is generated to have hierarchical orthogonality considering epipolar constraints in stereo vision, and is emitted through the projector.

The mixed signal reflected from the object and received by the camera is separated by a decoding scheme for separating an original signal, and a scheme of efficiently estimating a conversion relationship between the projector and the camera based on the intensity of the separated signal is applied.

Through this process, the image creation at a time point of the projector and the estimation of the 3D depth image are simultaneously performed by generating the image at a time point of the projector and combining the image with the depth image in the structural light.

That is, the conventional method has been limitedly performed on an object having simpler characteristics, such as reflection, transmission and absorption, mainly in a restricted environment such as a studio. One main reason is that 3D image and calculation model creation is made using only interpretation of physical properties of the light source, the object and the sensor (e.g., a shape from shading, photometric stereo, etc.), and the geometrical relationship (e.g., passive or active stereo, structure from motion, etc.) therebetween.

The second embodiment according to an embodiment of the present invention overcomes the limitations of the conventional method by suggesting a method for combining (1) a radiometry interpretation including scattering in the light source and at the object surface, reflection, and reception at the image sensor, and (2) a geometrical interpretation including projection of a 2D image surface into 3D space at the projector, epipolar constraints among the projector, the object and the camera, and projection from 3D space to the camera 2D image surface.

Figure 9:
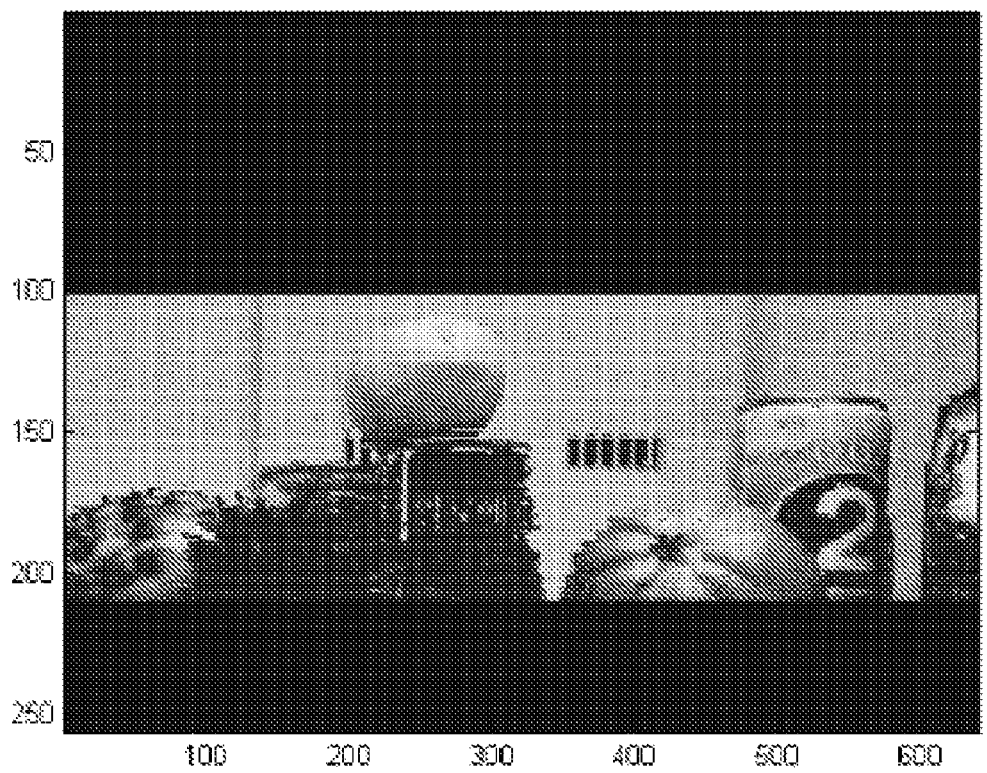

Accordingly, in the second embodiment, it is possible to obtain a new image viewed from the projector side as shown in FIG. 9 in estimating a signal of the corresponding camera side at each position at the projector side. In FIG. 9, the areas that are not restored at upper and lower ends are caused by the projector view and camera view that do not overlap, and the noise is caused by the use of only the greatest value of the mixed signal in calculation.

Figure 6:
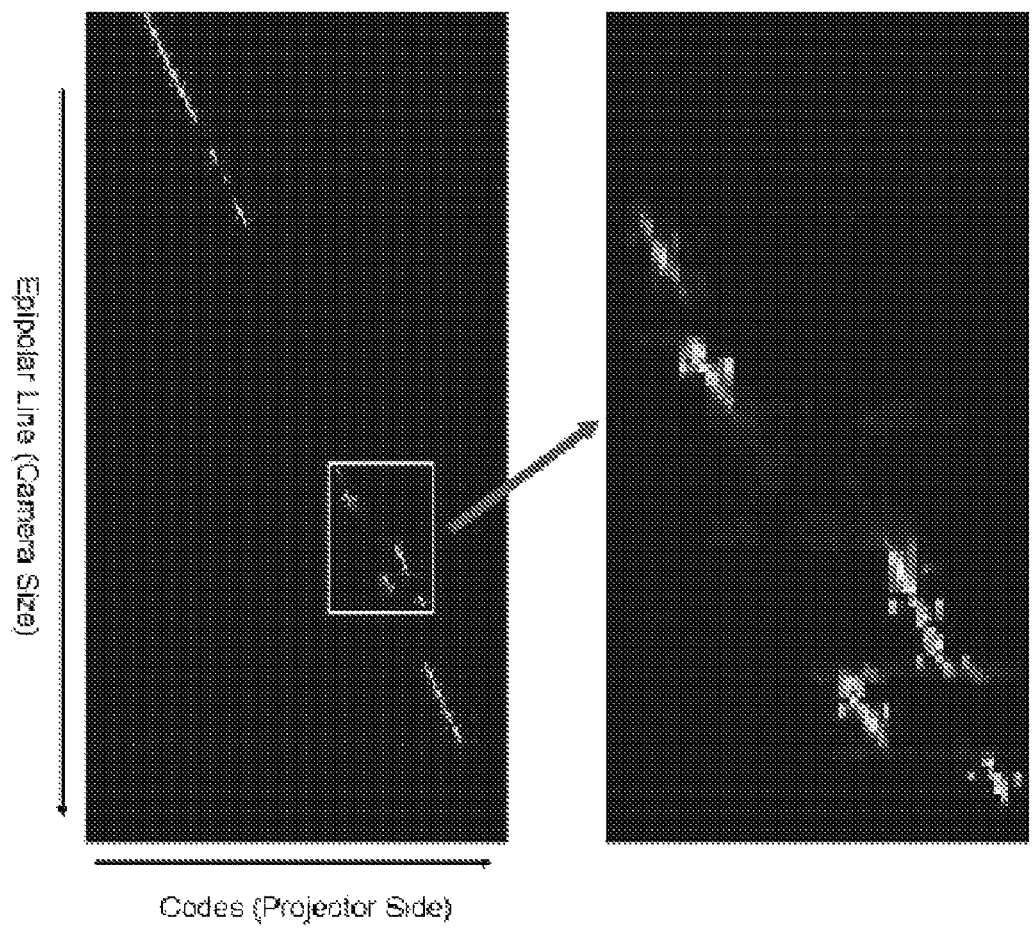
FIGS. 6 and 7 illustrate a signal separation map obtained by performing signal separation on a specific epipolar line and a dual photography image created using the signal separation map.
Figure 7:
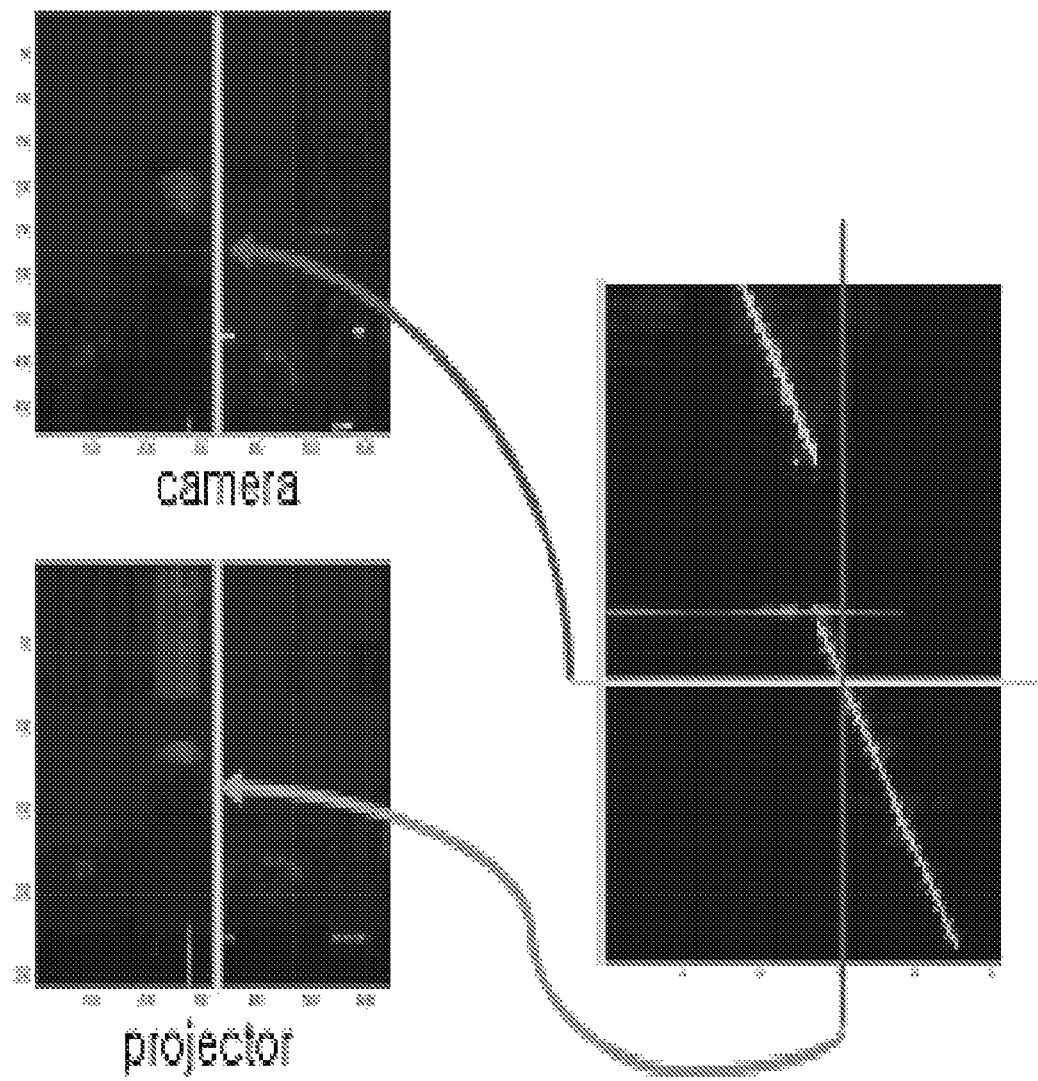

FIGS. 6 and 7 illustrate a signal separation map obtained by performing signal separation on a specific epipolar line and a dual photography image created using the signal separation map.

FIG. 6 shows the relationship between separated signals, as an example of the relationship between a group of signals sent by the projector (horizontal axis) and a group of signals received by the camera (vertical axis). In FIG. 6, the brightness indicates the intensity of correspondence. A small expanded area shows that correspondence between the projector signal and the camera signal is M:N, not 1:1. The simplest method for determining signal correspondence between the projector and the camera is to select a projector signal having the greatest intensity for each address at the camera pixel side.

FIG. 7 shows a principle of creating a new image in a projector side using this signal relationship. Unlike FIG. 6, when all projectors determine the address at the camera side, it is allowed to obtain a new image viewed from the projector (a right side in FIG. 7). That is, a brightness value at an x, y position of the new obtained image can be represented by dual image(x, y)=ref(arg max (j) Ty(j, x), y). ref indicates an image at the projector side, and Ty indicates a mixing and separating map at the y-th row (epipolar line).

Figure 8:
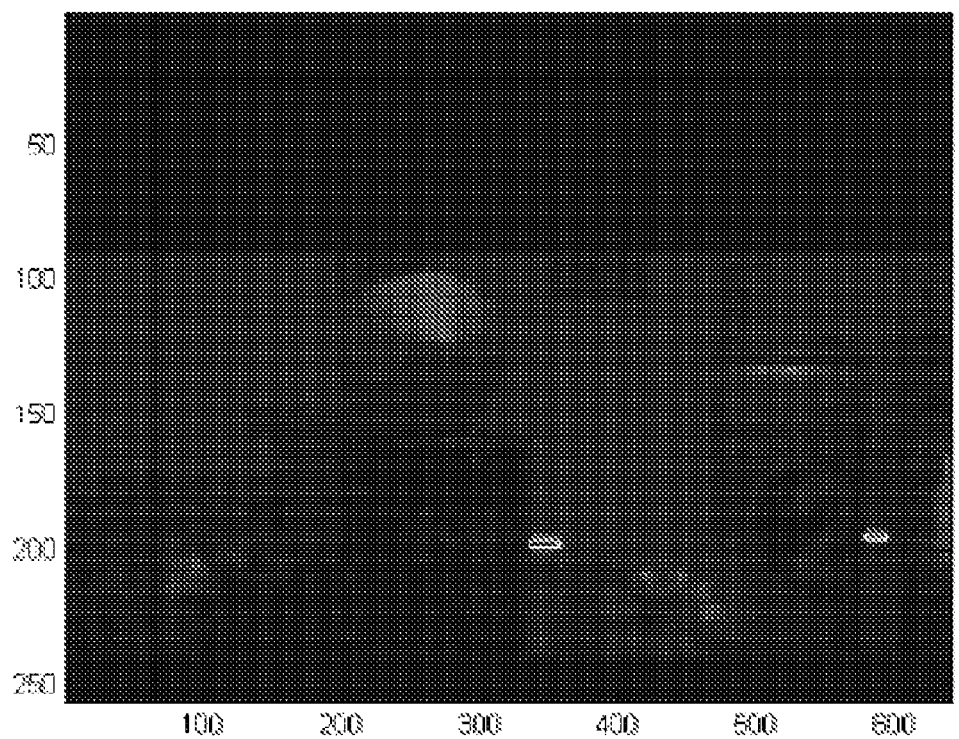
FIGS. 8 and 9 illustrate dual photography using signal separation coding.

FIGS. 8 and 9 are examples of dual photography using signal separation coding.

That is, FIG. 8 shows a gray scale image in a refrigerator that is imaged at a camera side, and FIG. 9 shows an image at a new visual point, viewed from the projector side, which is created using a separated signal on all epipolar lines. The camera and the projector are placed at upper and lower positions when imaging an object, respectively. Accordingly, it can be observed that an air ventilation hole at a rear is located at a lower position when viewed from the projector side rather than from the camera side.

That is, according to the second embodiment in which the interpretation of a physical aspect and the interpretation of a geometrical aspect are combined, it is possible to partially solve difficulty in obtaining the 3D image and creating the model due to scattering, reflection, absorption, and transmission on various object surfaces that may be easily overlooked when only the geometrical aspect is considered. It is also possible to solve the problem of numerous calculations making implementation using a sensing system difficult, in interpreting physical conversion among the artificial light source, the object and the camera when only the interpretation at the physical aspect is considered.

As described above, with the structural light-based 3D depth imaging method and system according to the present invention, it is possible to exactly separate the signal even when the signal received by the image receiving means undergoes overlapping and distortion due to the geometrical structure of the object. It is also possible to obtain a depth image that is robust against ambient environmental noise.

With the 3D depth imaging method and system according to the present invention, it is also possible to solve the problem of numerous calculations arising when the projector side creates the image. It is also possible to obtain a 3D image that is robust against noise using both the projector image and the restored 3D geometrical information.

Exemplary embodiments of the present invention have been disclosed herein and, although specific terms are employed, they are used and are to be interpreted in a generic and descriptive sense only and not for purpose of limitation.

Accordingly, it will be understood by those of ordinary skill in the art that various changes in form and details may be made without departing from the spirit and scope of the present invention as set forth in the following claims.

What is claimed is:

1. A method of 3D depth imaging by transmitting light signals to a measurement target object using a projection means and receiving the light signals reflected from the measurement target object using a receiving means, the method comprising the steps of:
   a) assigning an address to a transmitting pixel of the projection means and encoding the light signals of the transmitting pixel to carry the address assigned to it;
   b) restoring one or more addresses of the transmitting pixel embedded in the light signals captured by a receiving pixel of the receiving means; and
   c) determining a position of the target object surface, which corresponds to the receiving pixel, using the one or more addresses of the transmitting pixel restored from the receiving pixel,
   wherein step a) comprises the steps of:
      a1) segmenting a whole set of transmitting pixels into n mutually exclusive subsets;
      a2) assigning unique codes to each of the n mutually exclusive subsets;
      a3) recursively applying step a) and step b) to individual subsets generated from the recursion m times to produce m layers of subset hierarch; and
      a4) concatenating the unique codes of the m subsets in hierarchy to which the transmitting pixel belongs, and
   wherein step b) comprises the steps of:
      b1) separating the captured light signals into m sub-signals in such a way that the m sub-signals correspond to their respective layers in the m layers of subset hierarchy;
      b2) identifying, for each of the m sub-signals, one or more subsets unique codes of which are embedded in the sub-signals; and
      b3) restoring the addresses by concatenating the one or more subsets unique codes of the m subsets selected from the m layers of subsets corresponding to the m sub-signals.

2. The method according claim 1, wherein the set of transmitting pixels to be segmented into n mutually exclusive subsets represents pixels on an epipolar line of the projection means.

3. The method of claim 1, wherein the unique codes assigned to each of the subsets in step a2) are orthogonal.

4. The method of claim 1, wherein step b2) is carried out by using the inner product between the sub-signal and the unique codes of the subset defined in the layer corresponding to the sub-signal, as the intensity of correspondence of the sub-signal to its corresponding subset.

5. The method of claim 1, wherein step b3) comprises the steps of:
   b31) computing the intensity of correspondence of the receiving pixel to the concatenated unique code from m selected subsets by summing up the intensities of correspondence of m individual sub-signals to their corresponding subsets selected;
   b32) selecting the possible address candidates as those concatenated unique codes that have their intensities of correspondence greater than a threshold; and
   b33) finalizing the addresses by eliminating or correcting erroneous candidates using rules that address the consistency of the transmitting pixels at or near the subset boundary with its adjacent pixels.

6. The method according to claim 5, wherein the rules in step b33) comprise:
   a first rule that the restored addresses gradually increase or decrease with continuity when the signal is obtained from a slated surface of the target;
   a second rule that the restored addresses vanish or are transposed in part with no continuity when the signal is obtained from a cut surface of the target; and
   a third rule that the restored addresses vanish with no continuity when the signal vanishes by a shadow of the target.

7. The method according to claim 5, wherein step b33) comprises the steps of:
   b331) obtaining a signal separation map by setting one axis as the addresses of the pixels on a transmitting side of epipolar line and another axis as the addresses of the pixels on a receiving side of epipolar line and by setting a point value of the map as the intensity of correspondence of the receiving pixels to one of its possible candidates for the restored addresses of the transmitting pixels;
   b332) selecting those point values on the map with high reliability, in terms of the height of the intensity of correspondence and the point concentration of the intensity distribution along the axes of both receiving as well as transmitting pixel addresses, and fixing the address correspondences defined by those points; and
   b333) determining the address correspondences for the rest of the pixels by extending the already fixed points on the map according to the rules for selecting a point from distributed candidates.

* * * * *